(12) United States Patent
Liu et al.

(10) Patent No.: US 10,679,799 B2
(45) Date of Patent: Jun. 9, 2020

(54) SUPERCAPACITOR

(71) Applicant: Sizhi Liu, Guangdong (CN)

(72) Inventors: Sizhi Liu, Guangdong (CN); Xiaoping Ouyang, Xi'An Shanxi (CN)

( * ) Notice: Subject to any disclaimer, the term of this patent is extended or adjusted under 35 U.S.C. 154(b) by 0 days.

(21) Appl. No.: 15/569,532

(22) PCT Filed: Aug. 29, 2017

(86) PCT No.: PCT/CN2017/099453
§ 371 (c)(1),
(2) Date: Oct. 26, 2017

(87) PCT Pub. No.: WO2018/041095
PCT Pub. Date: Mar. 8, 2018

(65) Prior Publication Data
US 2019/0180949 A1 Jun. 13, 2019

(30) Foreign Application Priority Data
Aug. 29, 2016 (CN) .......................... 2016 1 0744968

(51) Int. Cl.
| | | |
|---|---|---|
| H01G 11/26 | (2013.01) | |
| H01G 11/30 | (2013.01) | |
| H01G 11/32 | (2013.01) | |
| H01G 11/38 | (2013.01) | |
| H01G 11/46 | (2013.01) | |
| H01G 11/48 | (2013.01) | |
| H01G 11/70 | (2013.01) | |
| H01G 11/78 | (2013.01) | |
| H01G 11/36 | (2013.01) | |
| H01G 11/04 | (2013.01) | |
| H01G 11/28 | (2013.01) | |
| H01M 4/36 | (2006.01) | |
| H01M 4/50 | (2010.01) | |
| H01M 4/583 | (2010.01) | |
| H01M 4/62 | (2006.01) | |

(52) U.S. Cl.
CPC ............. *H01G 11/38* (2013.01); *H01G 11/04* (2013.01); *H01G 11/26* (2013.01); *H01G 11/28* (2013.01); *H01G 11/30* (2013.01); *H01G 11/32* (2013.01); *H01G 11/36* (2013.01); *H01G 11/46* (2013.01); *H01G 11/48* (2013.01); *H01G 11/70* (2013.01); *H01G 11/78* (2013.01); *H01M 4/364* (2013.01); *H01M 4/502* (2013.01); *H01M 4/583* (2013.01); *H01M 4/624* (2013.01); *Y02E 60/13* (2013.01)

(58) Field of Classification Search
CPC ........ H01G 11/26; H01G 11/30; H01G 11/32; H01G 11/38; H01G 11/46; H01G 11/48; H01G 11/70; H01G 11/78
USPC ............................. 361/502, 503, 508, 516
See application file for complete search history.

*Primary Examiner* — Arun Ramaswamy
(74) *Attorney, Agent, or Firm* — J. Bennett Mullinax, LLC

(57) ABSTRACT

An electrical energy storage apparatus such as a capacitor, supercapacitor, hybrid supercapacitor, electrical double layer capacitor, battery or the like, comprising an electrode plate, an isolation film, a pole and a shell, wherein the electrode plate comprises a current collector and a coating disposed on the current collector, the coating comprises active material, conductive agent and adhesive in the mass ratio of (70-95):(2-20):(3-10); the active material comprises carbon material, conductive polymer and graphite type carbon nitride in the mass ratio of (60-90):(5-30):(5-10); the carbon material is nitrogen-doped graphene that has been functionalized with poly (3-hexylthiophene), and the surface of graphene is deposited with oxides of manganese or manganese dioxide nanoparticles; the conductive polymer is at least one of polyaniline, polythiophene and polypyrrole.

15 Claims, 2 Drawing Sheets

SUPERCAPACITOR

RELATED APPLICATIONS

This application claims the benefit of Chinese Application Serial No. 201610744968.4 filed on Aug. 29, 2016 and which is incorporated herein by reference.

FIELD OF THE INVENTION

The invention belongs to the technical field of charge storage and energy storage devices such as capacitors, supercapacitors, electric double layer capacitors (EDLCs) and batteries, and, in particular to a hybrid capacitor having good reversibility, electrochemical stability, excellent cycle life performance, charge and energy retention, and safety.

BACKGROUND OF THE INVENTION

Portable electronic and electrical apparatuses have ever increasing demands for their associated energy sources. The energy sources must combine a high level of energy, power and/or power storage with low weight and volume in order to allow portability of the apparatuses. These energy sources must also be cost efficient, operate over a broad range of temperatures, provide for a long shelf life, for long periods of charge or energy retention, and be safe to use, transport, and recharge.

There is an unmet need for capacitors or energy storage devices or apparatuses that combine the properties of high energy density (SN), high energy per mass (S/M), high cycle life (#), high charge or energy retention ($R_C$ or $R_E$), the combination of high $T_{Upper}$ and low $T_{Lower}$ and fire and explosion resistance at low cost. This currently limits the capabilities of portable electronic apparatuses resulting in less than desirable performance, cost, safety and environmental protection.

For example, batteries, such as rechargeable lithium batteries (RLiB) exhibit relatively high S/V (as high as ca. 900 Wh/liter) and S/M (as high as ca. 400 Wh/Kg), but suffer from relatively high $T_{Lower}$ (ca. −10 C or higher) where battery discharge capacity is reduced by at least about 20% and do not operate below about ca. −20 C. Additionally RLiB have relatively low $T_{Upper}$ (ca. 50 C-60 C) as RLiB may become dangerous if used above 60 C, and thus are not recommended for use above 60 C. Further, RLiB batteries typically also perform relatively poorly with respect to charge and energy retention ($R_C$ or $R_E$ ca.≤50% retention over 180 days), as well as charge and discharge current capability ($I_C$ and $I_D$≤1.2 C, where C is equal to the amount of current required to discharge said apparatus to its termination voltage in a 1 hour period), and explosion resistance and fire resistance; the latter two factors have limited their use and have caused risk to the public. Additionally, rechargeable batteries such as RLiB or the like, typically exhibit cycle life (#) performance of 2,000 cycles or less (more typically 1,000 cycles or less). These characteristics of rechargeable batteries, such as RLiB or the like, limit their usefulness and make them expensive over the long term, as they must be replaced after a few years or ~2,000 charge/discharge cycles or less. Even the best rechargeable RLiB batteries are projected to have less than ~1% of their initial charge capacity when approaching charge/discharge cycle numbers (#) of ca. 40,000 or more when charging/discharging at 1 C or higher. Further, most of these rechargeable battery devices or apparatuses are not recyclable or are difficult to recycle, and are not environmentally friendly as they may contain non-compliant and/or toxic substances that may result in harm to the environment.

Traditional capacitors, EDLCs, or supercapacitors also exhibit short comings. While they may exhibit satisfactory $T_{Lower}$ and $T_{Upper}$, as well as #, they typically suffer from relatively low C/V (ca. 10,000 F/liter or less), C/M (ca. 7,000 F/Kg or less), S/V (ca. 8-35 Wh/liter or less) and S/M (ca. 6-15 Wh/Kg or less) and charge and energy retention (both $R_C$ and $R_E$ typically ≤50% retention after 30 days after charging, and typically ≤10% after 180 days after charging) as well as relatively high initial cost per unit performance as well as overall lifetime cost.

Accordingly, there remains room for improvement and variation in the art of energy storage apparatuses, including supercapacitors and hybrid capacitors, leaving an unmet need for devices offering a superior combination of any or all of these missing performance characteristics.

SUMMARY OF THE INVENTION

It is an aspect of at least one embodiment of the present invention to provide an energy storage device or apparatus or capacitor, supercapacitor, hybrid capacitor or other apparatus having at least one of the properties of capacitance density (C/V ca. 90,000 F/l to ca. 300,000 F/l or higher), capacitance per mass (C/M ca. 40,000 F/Kg to ca. 150,000 F/Kg or higher), energy density (S/V ca. 70 Wh/l to 400 Wh/l or higher), energy per mass (S/M ca. 40 Wh/Kg to 150 Wh/Kg or higher), cycle life (#>2,000 cycles, typically 100,000 cycles or higher), high charge and energy retention ($R_C$ and $R_E$≥50% after 180 days after recharging respectively), thermal stability ($T_{Upper}$>60 C and typically ca. 70 C or higher, and $T_{Lower}$ less than −10 C, more preferably less than −20 C, and typically ca. −40 C or lower), charge and discharge current capability ($I_C$ and $I_D$≥1.2 C, where C is equal to the amount of current required to discharge said apparatus to its termination voltage in a 1 hour period), safety factor (i.e., fire resistance and explosion resistance "passes" the specified tests as defined below), is recyclable, is environmentally friendly, and exhibits rapid charge and discharge capabilities.

Further, due to the fire and explosion resistance of the devices of the present invention combined with other properties of the devices, including at least consistency in capacitance value from device to device as well as consistency in equivalent series resistance (ESR) from device to device, a plurality of the devices may be used to form an apparatus comprising a multiple number of the devices wherein the apparatus may be configured with series or parallel electrical configuration or a mixture of both electrical configurations, and wherein no voltage management or voltage monitoring circuitry is necessary to enable charging or fast charging of the apparatus comprised of multiple devices. This further enables simplicity in design as well as reduced cost in these high performance assemblies.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying drawings, in which.

DETAILED DESCRIPTION OF PREFERRED EMBODIMENTS

Figure 1:
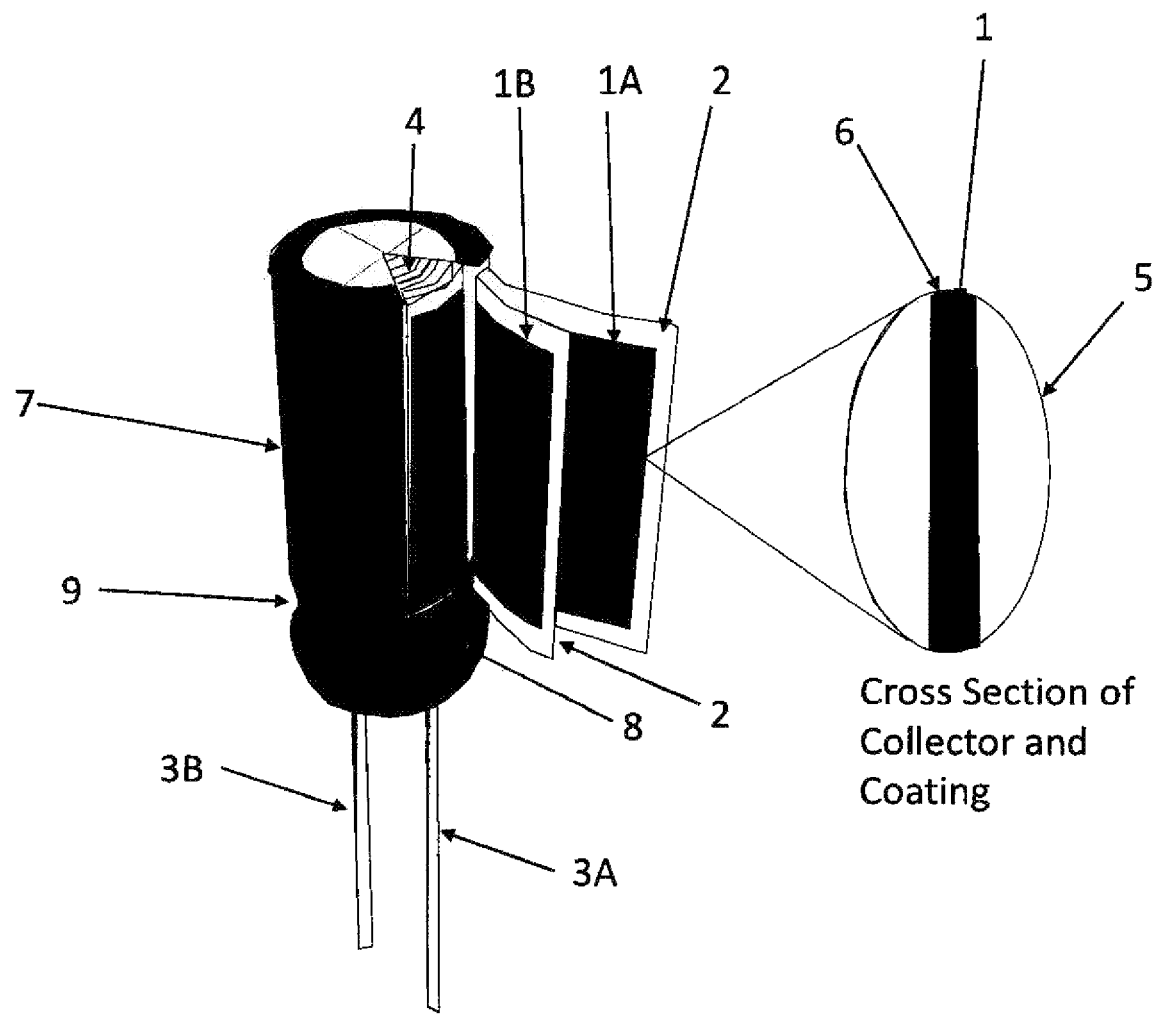
FIG. 1 is a perspective view in a partial section of an embodiment of the present invention as seen in reference to a hybrid capacitor.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to about 7 also includes a limit of up to about 5, up to about 3, and up to about 4.5.

For the intents and purposes of the invention, and as would be understood by those skilled in the art, the following definitions are used with regard to the subject invention.

C/V is capacitance (C) density, and is the amount of capacitance (typically in Farads (F)) divided by the volume (V) of the entire apparatus, less the volume of any input-output structures (typically known as leads or terminals) as well as less the volume of any mounting hardware or other hardware or structures that are not necessary to the electrical operation of the device or apparatus.

C/M is capacitance (C) per mass (M), and is the amount of capacitance (C, typically in F) divided by the mass (M, typically in Kg) of the entire apparatus, less the mass of any mounting hardware or other hardware or structures that are not necessary to the electrical operation of the apparatus.

S is useful stored energy (typically expressed in watt hours (Wh)), and for a capacitor, is equal to the product of one half of the design capacitance or actual capacitance (C) multiplied by the difference of the square of the charged voltage ($V^2_{Charged}$) to which it has been charged, less the square of the terminal voltage ($V^2_{Terminal}$) to which it is discharged, all divided by 3,600; for a battery, S is either the charge or the discharge current ($I_{Discharge}$ or $I_{Charge}$, typically in Amperes (A)) multiplied by the difference between the charged voltage ($V_{Charged}$) and the terminal Voltage ($V_{Terminal}$) for the duration that said current is either delivered (discharging) or received (charging), either in seconds (s) divided by 3,600 or in hours (h)).

S/V is useful stored energy density, and is the amount of stored energy (typically expressed in watt hours (Wh)) as described above, divided by the volume (V) of the entire apparatus, less the volume of any input-output structures (typically known as leads or terminals), as well as less the volume of any mounting hardware or other hardware or structures that are not necessary to the electrical operation of the device or apparatus.

S/M is useful stored energy (S) per mass (M), and is the amount of useful stored energy (as described above), divided by the mass (M, typically in Kg) of the entire apparatus, less the mass of any mounting hardware or other hardware or structures that are not necessary to the electrical operation of the device or apparatus.

Maximum charge or discharge current ($I_C$ and $I_D$ respectively, in amperes (A)) is the maximum current that may be used to repeatedly charge and discharge the apparatus with 525% loss in C or S after no less than 2,000 charge/discharge cycles.

Charge retention ($R_C$) is the amount of charge of an energy storage apparatus (such as a capacitor, supercapacitor, EDLC, hybrid capacitor, battery or the like) that is retained for at least 180 days after fully charging said apparatus as determined by the voltage of said device across its terminals.

Energy retention ($R_E$) is the amount of energy retained in an energy storage apparatus (such as a capacitor, supercapacitor, EDLC, hybrid capacitor, battery or the like) at least 180 days after fully charging said apparatus as determined by the discharge curve (voltage vs. time under load, or the like) of said device or apparatus.

Lower operating temperature ($T_{Lower}$, typically in Celsius) is the lowest temperature at which the apparatus or device will perform with at least 20% and more preferably 20%-50% of its full capacitance (C) or useful stored energy (S) as described above.

Upper operating temperature ($T_{Upper}$, typically in Celsius) is the highest temperature at which the device or apparatus will safely perform (without undue risk of fire or explosion as defined herein) with at least 20% and more preferably 20/–50% of its full capacitance (C) or useful stored energy (S) as described above.

Cycle life (#) is the number of charging/discharging cycles that a device or apparatus will endure with no more than 25% loss in capacitance (C) or in useful stored energy (S), wherein a cycle is defined by first charging the apparatus from $V_{Terminal}$ to $V_{Charged}$, holding at $V_{Charged}$ for 0 or more time, then discharging the apparatus back to $V_{Terminal}$ and holding that voltage for 0 or more time.

Fire resistance (or lack thereof) of an apparatus is a safety factor, and is established by whether or not said apparatus at least passes the entirety of the tests outlined in section 4.5 of Chinese Standard GB/T 18287 (2013 version) or an equivalent or more demanding specification as applicable and appropriate.

Explosion resistance (or lack thereof) of an apparatus is a safety factor, and is established by whether or not the apparatus at least passes the entirety of the tests outlined in section 4.5 of Standard GB/T 18287 (2013 version) or an equivalent or more demanding specification as applicable and appropriate.

Recyclable is the ability of a device or apparatus to be recycled without undue effort or expense, and in a generally existing and/or acceptable manner.

Environmentally friendly means the devices or apparatuses contain no materials requiring special disposal, (i.e., contains no materials that are considered to be hazardous waste (HW) as defined by the United States Environmental Protection Agency (EPA), or regulatory authority at levels that are above permissible limits).

The device or apparatus of this invention may be in the form of an energy storage device such as a capacitor, a supercapacitor, an EDLC, a hybrid capacitor, a battery or the like, that is an efficient, environmentally-friendly energy storage apparatus. The apparatus of the present invention combines many advantages of traditional capacitors and batteries, such as high capacitance density (C/V ca. 90,000 F/l to ca. 300,000 F/l or higher) and capacitance per mass (C/M ca. 40,000 F/Kg to ca. 150,000 F/Kg or higher), combined with high energy density (S/V ca. 70 Wh/l to 400 Wh/l or higher), and energy per mass (S/M ca. 40 Wh/Kg to 150 Wh/Kg or higher), long service life and cycle life (#>2,000 cycles and typically 100,000 cycles or higher), high thermal stability ($T_{Upper}$>60 C and typically ca. 70 C or higher, and $T_{Lower}$ less than −10 C and typically ca. −40 C or lower), high charge and energy retention ($R_C$ and $R_E \geq 70\%$ of initial charge voltage and stored energy respectively, as defined herein, at least 180 days after charging), high charge and discharge current capability ($I_C$ and $I_D \geq 1.2$ C, where C is equal to the amount of current required to discharge said apparatus to its termination voltage in a 1 hour period), high safety factor (i.e., fire resistance and explosion resistance "passes" as defined above), environmentally friendliness (is recyclable), and exhibits rapid charge and discharge capability.

Further, due to the fire and explosion resistance of the devices of the present invention combined with other properties of the devices including at least consistency in capacitance value from device to device, as well as consistency in equivalent series resistance (ESR) from device to device, a plurality of the devices may be used to form an apparatus comprising a multiple number of the devices wherein the apparatus may be configured with series or parallel electrical configuration or a mixture of both electrical configurations, and wherein no voltage management or voltage monitoring circuitry is necessary to enable charging or fast charging of the apparatus comprised of multiple devices. This further enables simplicity in design as well as reduced cost in these high performance assemblies.

The capacitance (C) of the device of the present invention is achieved through one or more mechanisms of electrostatic capacitance, electrolytic capacitance, electronic double layer capacitance, and electrochemical capacitance or pseudocapacitance. Typically the dominant capacitance generation mechanisms in said devices are electronic double layer capacitance and electrochemical or pseudocapacitance. Further, the capacitance of the devices of the present invention increases with increasing overlap area between the anode and the cathode, and capacitance increases as the useful surface area of each of the cathode and/or anode increases as well. This increase is enabled by maximizing the useful surface area of the deposited material on said cathode and/or anode, which is achieved by maximizing the surface area per mass or per volume that is achieved by way of a suitable pore diameter (typically >2 nm) of the deposited anode and/or cathode materials, thus enabling relatively uninhibited formation of the electronic double layer or other means of capacitance generation. Additionally, useful surface area is increased through use of three dimensional layered structures, such as nitrogen doped graphene, that further increase useful surface area. Useful surface area may be further increased through additional intercalation mechanisms of said layered graphene structure so as to maximize the formation of the electronic double layer throughout said multilayered graphene structure.

Further, the capacitance (C) that is generated by way of electrochemical capacitance or pseudocapacitance is maximized by maximizing the useful amounts of the one or more of oxide(s) of manganese or manganese dioxide. This is achieved through optimization of the microstructure so as to enable maximal amounts of reduction/oxidation reaction of said oxide(s) of manganese or manganese dioxide to occur per unit mass or unit volume of deposited material. Thus, nanostructures that allow consistent and relatively uninhibited access of electrolyte to a maximum amount of said oxide(s) of manganese or manganese dioxide per unit mass or unit volume are preferably used.

Additionally, the capacitance per volume (C/V), as well as the capacitance per mass (C/M) may be further increased through the use of thinner separator materials between the anode and cathode of said devices, or by the use of thinner anode and/or cathode foils, or by the elimination of the cathode and/or anode foils, or by tighter winding, compaction or other means of packing the cathode, separator, anode assembly in less volume and with less mass of the final device. The geometry and/or exterior packaging of the device to achieve its final form may also be optimized so as to maximize C/V and/or C/M. Additionally, the useful energy per volume (SN) as well as the useful energy per mass (S/M) of the device may be further increased by way of using materials, such as an electrolyte or other materials that enable higher operating voltage of said device, as the useful energy of the device increases as the square of the operating voltage increases. This is enabled through use of ionic liquids as electrolytes or the like.

Therefore, the apparatuses resultant from this invention have broad application space in all portable electronics and electrical apparatuses such as consumer electronics, automotive/transportation (such as car/truck/rail/etc.), aerospace, military/national defense and other fields. Additionally, the invention is useful in certain less mobile applications, such as uninterruptible power supplies, local storage for alternative energy production (e.g., solar cells, wind power and the like), communications base stations, remote power storage, etc. The invention thus addresses at least a portion of the unmet need described above, with relatively low initial cost, as well as very low long term cost.

To achieve the above objective, the invention adopts the following technical scheme:

A hybrid supercapacitor, or other charge and/or energy storage apparatus, as shown in FIG. 1 is provided by a capacitor element 4 which includes electrode plates comprising anode foil 1A, cathode foil 1B, and an isolation or separator film 2. Anode foil 1A is made of aluminum or suitable conductor material. Cathode foil 1B is also made of aluminum or suitable conductor material. Anode foil 1A and cathode foil 1B are layered and wound or otherwise layered together with separator 2 disposed there between.

On top of the anode or cathode foils (1A and 1B respectively), a coating material layer 6 is formed on anode foil 1A and cathode foil 1B, as shown in magnified cross section 5. Coating layer 6, provided on the surfaces of anode foil 1A, cathode foil 1B is comprised of active material, conductive agent and adhesive as defined herein. Coating layer 6 may be differently optimized for each of the cathode and the anode respectively. Ends of poles or lead wires 3A, 3B are connected to anode foil 1A, and cathode foil 1B respectively, and second ends thereof are led out from capacitor element 4. The coating layer 6 comprises a homogeneous mixture of active material, conductive agent and binder or adhesive in the mass ratio of (70-95):(2-20):(3-10).

An outer shell or housing 7 is formed of a cylindrical shell or housing or the like, combined with a sealing body 8. Housing 7 accommodates capacitor element 4 that is impregnated with electrolyte solution. Sealing body 8 is provided with through holes for lead wires 3A and 3B to run through respectively. Sealing body 8 is disposed at an opening of housing 7, and a drawing process or the like is provided to an outer wall of shell or housing 7 so as to compress and deform sealing body 8, thereby sealing the opening with the aid of sealing body 8 at crimp 9 or the like. Further, the active material comprises a mixture of carbon material, conductive polymer and graphite-type carbon nitride in the mass ratio of (60-90):(5-30):(5-10), wherein the carbon material is nitrogen-doped graphene that has been functionalized with poly (3-hexylthiophene), and the surface of the graphene is deposited with nanoparticles of manganese dioxide or other oxides of manganese.

The graphene has an atomic content of nitrogen dopant from 0.1 at % to 10 at %, and more preferably from 1 at % to 5 at %. The mass ratio of the poly (3-hexylthiophene) to graphene is 1:(10-40). The particle size of the manganese dioxide nanoparticles is from 10 nm to 1 μm, and more preferably 50 nm to 500 nm. The mass ratio of the total mass of the oxides of manganese or of the manganese dioxide nanoparticles to the graphene is 1:(10-30). Additionally, the conductive polymer is at least one of polyaniline, polythiophene and polypyrrole.

In one or more embodiments, the conductive polymer has a weight-average molecular weight of 1,000 to 1,000,000 and more preferably of 5,000-100,000.

The graphite-type carbon nitride has a porous structure having a pore diameter of 2 nm to 200 nm and more preferably a mesoporous structure having a pore diameter from 10 nm to 20 nm. The mesoporous structure provides a large specific surface area that is useful to develop a maximal amount of electronic double layer area and to improve the electrochemical performance of the apparatus as well.

The graphene has a lamellar structure having 1 to 1,000 layers and more preferably 20-100 layers. In some embodiments, of the present invention, each graphene layer has a layer thickness of 0.4 nm to 5 nm and more preferably, an individual layer thickness of 1.0 nm to 1.6 nm.

The graphene has a porous structure having a pore diameter of 2 nm to 10 μm and more preferably 40 nm to 2 μm. The porous hierarchical structure of the graphene of the present invention synergistically facilitates the fast transmission of ions or other charged species so as to improve the electrochemical performance of the apparatus, as well as to improve the kinetics of formation of the maximized electronic double layer.

The carbon material used in the apparatus of the present invention has the advantages of good conductivity, larger specific surface area and stable performance with regard to at least life cycle (#) performance. It is combined with at least one transition metal oxide and/or conductive polymer, to improve conductivity as well as cycle life (#), and charge and energy retention ($R_C$ and $R_E$) stability, as well as to address other performance deficiencies noted herein, so that the present invention addresses unmet need by providing at least higher charge storage (C/V, and C/M) and useful energy storage (S/V, S/M), etc., in comparison to other capacitor devices. This is achieved by way of one or more of the mechanisms of pseudocapacitance, electrochemical capacitance, and/or electrolytic/electrostatic capacitance as realized in the device or apparatus of the present invention.

Additionally, the device of the present invention exhibits superior performance to rechargeable batteries, such as RLiB and the like with respect to at least $T_{Upper}$, $T_{Lower}$, #, $R_C$, $R_E$, $I_C$, $I_D$, safety (fire and explosion resistance) as well as recyclability and environmental friendliness as defined herein.

In some embodiments, the conductive agent is acetylene black or carbon black with an adhesive or binder of polyvinylidene fluoride (PVDF) or polytetrafluoroethylene (PTFE) or a combination thereof.

One suitable preparation method of nitrogen-doped graphene functionalized with poly (3-hexylthiophene) may comprise the following steps:

Step 1: Preparation of Graphecne Oxide Functionalized with Poly (3-Hexylthiophene)

Thionyl Chloride ($SOCl_2$) is added to unsaturated dimethylformamide (DMF) solution wherein the mass ratio of ($SOCl_2$) to graphene oxide is between about 1000:1 and 300:1, and the $SOCl_2$, graphene oxide, DMF mixture is heated to 70° C.-90° C. in a nitrogen production atmosphere, and is reacted for 10 h to 30 h. The excess DMF is removed by steaming under reduced pressure, and the mixture is then vacuum dried at 40° C.-70° C. in order to obtain acyl-chlorinated graphene oxide (ACGO). The acyl-chlorinated graphene oxide (ACGO) is then dispersed in DMF at the mass ratio of ACGO to DMF of about 1:3,000 to 1:10,000. The mixture is then uniformly stirred in an inert atmosphere of nitrogen gas, and then 0.01 w % to 0.03 w % of 3-thiophenecarboxylic acid is added. After stirring for 20 minutes to 1 hour, a 1 w % to 10 w %, and more preferably a 1.5 w % to 4.6 w %, addition of triethylamine is added, and the mixture is heated to between 110° C. and 130° C. and stirred for an additional 10 h to 30 h. The excess 3-thiophenecarboxylic acid is then centrifugally removed and the remaining supernatant acetylated product is then transferred to a reaction vessel. Anhydrous chloroform is subsequently added at the level of 25V % to 60V % and the mixture is ultrasonically reacted for 40 minutes to 80 minutes. A chloroform solution of 3-hexylthiophene, having a concentration of 15 mg/mL to 30 mg/mL is added to the mixture at the level of 6.5V % to 17.5V %. The resulting mixture is then stirred for 10 h to 30 h, and anhydrous ferric chloride is added at a level of 0.3 w % to 1.1 w %, and is then reacted for 10 h to 24 h at room temperature. After the reaction has completed, the solution is poured into excess methanol to precipitate a product; and the product is purified by a Soxhlet extraction method and is then vacuum dried for 3 h to 10 h. The resulting product is graphene oxide that has been functionalized with poly (3-hexylthiophene);

Step 2: Preparation of Nitrogen-Doped Graphene Functionalized with Poly (3-Hexylthiophene)

To a suitable mixing vessel, a sufficient amount of urea is added to the graphene oxide that has been functionalized with poly (3-hexylthiophene) along with a suitable amount of distilled water. The mixture is uniformly mixed in an ultrasonic mixer, and dried at 30° C.-50° C. The dried mixture is then transferred to a PTFE-lined hydrothermal reactor, and is reacted for 1 h to 5 h at 130° C. to achieve a solid product that is cooled to room temperature and then washed to obtain nitrogen-doped graphene functionalized with poly (3-hexylthiophene);

Step 3: Deposition of Manganese Dioxide Nanoparticles on Graphene

The nitrogen-doped graphene that has been functionalized with poly (3-hexylthiophene) is then mixed with appropriate amounts of $MnCl_2 \cdot 4H_2O$ and isopropanol in order to form a mixed solution, which is then heated to 60° C.-85° C. while stirring, to obtain said mixed solution. A suitable amount of $KMnO_4$ is then added to the mixed solution, and it is then reacted at 60° C.-85° C. for an additional 1 h to 3 h. The resulting black precipitate is centrifuged, washed, dried and ground to achieve nitrogen-doped graphene functionalized with poly (3-hexylthiophene).

The active material of the present invention comprises carbon material, conductive polymer and graphite-type carbon nitride. The active material is a mixture of a plurality of materials, where the carbon material is a nitrogen-doped graphene functionalized with poly (3-hexylthiophene) and the surface of the graphene is deposited with oxides of manganese or manganese dioxide nanoparticles, and the conductive polymer is at least one of polyaniline, polythiophene or polypyrrole.

Due to the carbon six-membered ring structure of the molecular modified graphene, a relatively large amount of highly delocalized x-type electrons are present. These x-type electrons exhibit strong i-x bond interaction between the graphene layers, which adversely affects the dispersability of said modified graphene sheets. Accordingly, poly (3-hexylthiophene) is added as a conductive polymer having a relatively high charge mobility combined with a relatively large amount of $\pi$-bonds as well as a relatively high amount of bond conjugation. Thus, by using the poly (3-hexylthiophene) with the grapheme material, interaction of the material with itself is limited and the modified graphenc maintains its preferred unagglomerated sheet form, which is achieved at least through the combination of a electrons and bond conjugation enabled by the poly (3-hexylthiophene). The combination of relatively high amounts of x-bonds and bond conjugation is highly valuable in that it enables de-agglomerated graphene sheets, which allows at least a maximization of the formation of the electronic double layer area, as well as the maximization of the formation of the amount of useful oxides of manganese or manganese dioxide on the modified graphene so as to maximize at least the electrochemical portion of the pseudocapacitance effect afforded by the use of oxides of manganese or manganese dioxide.

Since the N (nitrogen) atom has an atomic radius that is similar to that of the C (carbon) atom, the nitrogen can be used as an electron donor so as to dope the grapheme in a substitutional manner, and the generated nitrogen-doped graphene exhibits improved performance over pure graphene; with respect to at least improved cycle stability and cycle life (#), etc.

Further, the oxides of manganese or the manganese dioxide nanoparticles deposited on the graphene, act to provide improved interfacial contact between said oxide and the modified graphene, thereby increasing the conductivity of the electrode as well as the contact area between the electrode and the electrolyte. This structure enables a more effective utilization of the manganese oxides or the $MnO_2$ as well. Additionally, these oxide(s) further contribute to device performance by providing for at least good charge/discharge reversibility as well as electrochemical stability. This results in further enabling the apparatus with respect to at least longer cycle life (#) and overall apparatus life.

More specifically, the oxides of manganese or manganese dioxide nanoparticles enable efficient and reversible redox reaction through the quantum tunneling effect, which enables improved charge storage through one or more of at least increased pseudocapacitance, electrochemical energy storage, electrolytic charge storage, and electrostatic charge storage, due to a synergistic effect between said oxides and the modified graphene. The resulting apparatuses exhibit excellent C/V, C/M, S/V, S/M, $R_C$, $R_E$, $I_C$, $I_D$, #, $T_{Lower}$, and $T_{Upper}$ performance as described above, and exhibit a high safety factor, being resistant to fire and explosion, while being recyclable as well as environmentally friendly as defined herein. Additionally, the devices or apparatuses have excellent longevity and are low cost to manufacture. The devices or apparatuses also exhibit excellence in other charge and discharge characteristics.

Further, due to the fire and explosion resistance of the devices or apparatuses of the present invention, combined with other properties including at least consistency in capacitance value from device to device, as well as consistency in equivalent series resistance (ESR) from device to device, a plurality of the devices may be used to form an apparatus comprising a multiple number of the devices wherein the apparatus may be configured with series or parallel electrical configuration or a mixture of both electrical configurations, and wherein no voltage management or voltage monitoring circuitry is necessary to enable charging or fast charging of the apparatus comprised of multiple devices. This further enables simplicity in design as well as reduced cost in these high performance assemblies.

The nitrogen-doped graphene that has been functionalized with poly (3-hexylthiophene) acts to combine the advantages of graphene, oxides of manganese or $MnO_2$ and poly (3-hexylthiophene) to produce a synergistic effect, which maximizes the potential of each of the invented devices or apparatuses. The improvement in the performance of said apparatuses is thus larger than expected from the additive combination of these components. Thus, various embodiments of the invention exhibit at least improved C/V, C/M, S/V, S/M $R_C$, and $R_E$ over prior art capacitors or supercapacitors, and exhibit improved #, $R_C$, $R_E$, $I_C$, $I_D$, $T_{Lower}$, $T_{Upper}$, fire and explosion resistance over prior art rechargeable batteries in a manner that is low cost compared to prior art capacitors or supercapacitors or rechargeable batteries. Again, in comparison to the rechargeable batteries such as RLiB and the like, the devices of the present invention are also safe, and are environmentally friendly as well as recyclable.

The graphite-type carbon nitride structures of the invented apparatus also have a similar planar structure with respect to at least the graphene; and as described herein, de-agglomeration of the modified graphenc sheets is achieved through the combination of at least $\pi$-$\pi$ bond interaction and bond conjugation which synergistically increases at least one or more of the pseudocapacitance storage effect, the electrochemical storage effect, the electrolytic storage effect and the electrostatic storage effect. Further, the use of carbon nitride in the active material assists the intercalation of the graphene, so as to optimize the graphene structure as well as to further reduce or eliminate graphene agglomeration that would otherwise occur during the hydrothermal synthesis process. This results in an unanticipated increase in the useful surface area of the three-dimensional graphene which effectively improves the area of at least the electronic double layer, resulting in a larger than anticipated increase in capacitance. Thus, the resulting devices or apparatuses are effective as described herein as well as safe, recyclable and environmentally-friendly, and thus, the energy storage devices of the present invention combine many advantages of traditional capacitors and batteries without the associated shortcomings.

The apparatus of the present invention exhibits high capacitance density (C/V ca. 90,000 F/l to at least about ca. 300,000 F/l or higher), capacitance per mass (C/M ca. 40,000 F/Kg to at least about ca. 150,000 F/Kg or higher), combined with high energy density (S/V ca. 70 Wh/l to at least about 400 Wh/l), and energy per mass (S/M ca. 40 Wh/Kg to at least about 150 Wh/Kg), high charge and energy retention ($R_C$ and $R_E$ 170% of initial charge voltage and stored energy respectively, as defined herein, at least 180 days after charging), and high charge and discharge current capability ($I_C$ and $I_D \geq 1.2$ C, where C is equal to the amount of current required to discharge said apparatus to its termination voltage in a 1 hour period), combined with long service life and cycle life (#>2,000 cycles and is typically 100,000 cycles or higher), high thermal stability ($T_{Upper}$>60 C and typically ca. 70 C or higher, and $T_{Lower}$ less than −10 C and typically ca. −40 C or lower), and high safety factor (i.e., fire resistance and explosion resistance "passes" as defined herein), as well as being environmentally friendly and recyclable, and the invented devices or apparatuses exhibit rapid charge and discharge capability as well.

Further, due to the fire and explosion resistance of the devices of the present invention combined with other properties of the devices including at least consistency in capacitance value from device to device, as well as consistency in equivalent series resistance (ESR) from device to device, a plurality of the devices may be used to form an apparatus comprising a multiple number of the devices wherein the apparatus may be configured with series or parallel electrical configuration or a mixture of both electrical configurations, and wherein no voltage management or voltage monitoring circuitry is necessary to enable charging or fast charging of the apparatus comprised of multiple devices. This further enables simplicity in design, as well as reduced cost in these high performance assemblies.

Therefore, the apparatuses resultant of this invention have broad application across all portable electronics and electrical apparatuses such as consumer electronics, automotive/transportation (such as cadtruck/rail/etc.), aerospace, military/national defense and other fields. Additionally, the invention is useful in certain less mobile applications, such as uninterruptible power supplies, local storage for alternative energy production (e.g., solar cells, wind power and the like), communication base stations, remote power storage, etc. Thus, the present invention addresses at least a portion of these unmet needs with low cost. These devices are enabled by at least the combination of carbon material and conductive polymer which combine to exhibit synergistic effects as described herein.

Additionally, the conductive polymer improves one or more of the pseudocapacitance, the electrochemical mechanism of energy storage, the electrolytic and/or the electrostatic mechanisms of energy storage; and the carbon material acts as a skeleton in the active material complex to support the conductive polymer in order to achieve performance and stability of the invented apparatuses with regard to one or more of at least temperature, cycle life (#), and apparatus longevity and consistency with respect to at least the charge and discharge cycle character of said devices or apparatuses.

EMBODIMENTS

The invention and its beneficial effects will be described in detail hereinafter with reference to embodiments. The embodiments of the present invention are not limited thereto.

Embodiment 1

The embodiment provides a hybrid capacitor electrical energy storage device, as described heroin, comprising an electrode plate, an isolation film, a pole and a shell, wherein the electrode plate comprises a current collector and a coating disposed on the current collector; the coating comprises active material, conductive agent and a binder in the mass ratio of 80:15:5; and the active material comprises carbon material, conductive polymer and graphite type carbon nitride in the mass ratio of 75:20:5. The carbon material is nitrogen-doped graphene functionalized with poly (3-hexylthiophene), and the surface of graphene is deposited with manganese dioxide nanoparticles and the conductive polymer is polyaniline having a weight-average molecular weight of 70,000.

The graphene, has an atomic content of the doped nitrogen is 3 at %, and the mass ratio of poly (3-hexylthiophene) to graphene is 1:30 and the graphene has a porous structure having a pore diameter of 40 nm to 2 μm.

The particle size of the manganese dioxide nanoparticles is 50 nm to 500 nm, and the mass ratio of the total mass of manganese dioxide nanoparticles to the graphene is 1:15.

The graphite type carbon nitride has a mesoporous structure having a pore diameter of 10 nm to 20 nm.

The graphene has a lamellar structure having 55 layers and a layer thickness of 1.0 nm to 1.6 nm.

The conductive agent is acetylene black, and the adhesive or binder is polyvinylidene fluoride.

The preparation method of nitrogen-doped graphene functionalized with poly (3-hexylthiophene) comprises the following steps:

Step 1: Preparation of the Graphene Oxide Functionalized with Poly (3-Hexylthiophene)

30 mL of $SOCl_2$ is added to the DMF solution containing 100 mg of graphene oxide, heated to 80° C. in nitrogen atmosphere and reacted for 20 h. The excess DMF is steamed under reduced pressure, and the material is vacuum dried at 50° C. to obtain acyl-chlorinated graphene oxide (ACGO). Next, 10 mg of acyl-chlorinated graphene oxide (ACGO) is dispersed in 50 mL of DMF, which is uniformly stirred under the protection of nitrogen, and then 10 mg of 3-thiophenecarboxylic acid is added, followed by the addition of 2 mL of trimethylamine, which is added after stirring for 50 minutes, then heated to 120° C. for 20 h. The excess 3-thiophenecarboxylic acid is centrifugally removed to obtain an acetylated product and the acetylated product is transferred to a three-necked flask where 40 mL of anhydrous chloroform is added. Ultrasonic mixing is used for 60 minutes and then 10 mL of a chloroform solution of 3-hexylthiophene, having a concentration of 20 mg/mL, is added and is fully stirred for 20 h, then 0.8 g of anhydrous ferric chloride is added and reacted for 18 h at room temperature. The solution is then poured into methanol to precipitate a product and the product is purified by Soxhlet extraction method, which is then vacuum dried for 5 h to obtain graphene oxide that has been functionalized with poly (3-hexylthiophene).

Step 2: Preparation of Nitrogen-Doped Graphene Functionalized with Poly (3-Hexylthiophene)

Urea and graphene oxide functionalized with poly (3-hexylthiophene) are added into a beaker along with 60 mL of distilled water and the mixture is stirred uniformly in an ultrasonic mixer, and then dried at 40° C. The dried product is then transferred to a PTFE-lined hydrothermal reactor, and is then reacted for 3 h at 130° C., then allowed to cool to room temperature. The solid product is then washed to obtain nitrogen-doped graphene that has been functionalized with poly (3-hexylthiophene).

Step 3: Deposition of Manganese Dioxide Nanoparticles on Graphene

Nitrogen-doped graphene that has been functionalized with poly (3-hexylthiophene) is mixed with sufficient amounts of $MnCl_2.4H_2O$ and isopropanol to form a mixed solution that is then heated to 75° C. with stirring in order to obtain a mixed solution. A sufficient amount of $KMnO_4$ is then added to the mixed solution, and the resulting mixture is reacted for 2 h. The black precipitate obtained by the reaction is then centrifuged, washed, dried and ground to obtain nitrogen-doped graphene functionalized with poly (3-hexylthiophene).

Embodiment 2

The embodiment provides a hybrid supercapacitor electrical energy storage device, as described herein, comprising an electrode plate, an isolation film, a pole and a shell, wherein the electrode plate comprises a current collector and a coating disposed on the current collector, the coating comprises active material, conductive agent and adhesive in the mass ratio of 90.6:4.

The active material comprises carbon material, a conductive polymer having a weight-average molecular weight of 30,000 and graphite-type carbon nitride in the mass ratio of 85:9:6 where the carbon material is nitrogen-doped graphene that has been functionalized with poly (3-hexylthiophene), and the surface of graphene is deposited with manganese dioxide nanoparticles. Further, the graphene has an atomic content nitrogen dopant of 2 at %, and the mass ratio of poly (3-hexylthiophene) to graphene is 1:20. The particle size of the manganese dioxide nanoparticle is 50 nm to 500 nm, and the mass ratio of the total mass of manganese dioxide nanoparticles to the graphene is 1:20.

The conductive polymer is polythiophene.

The graphite type carbon nitride has a mesoporous structure having a pore diameter of 10 nm to 20 nm.

The graphene has a lamellar structure having 70 layers and a layer thickness of 1.0 nm to 1.6 nm.

The graphene has a porous structure having a pore diameter of 40 nm to 2 nm.

The conductive agent is carbon black, and the binder is polytetrafluoroethylene.

The preparation method of nitrogen-doped graphene functionalized with poly (3-hexylthiophene) comprises the following steps:

Step 1: Preparation of the Graphene Oxide Functionalized with Poly (3-Hexylthiophene)

30 mL of $SOCl_2$ is added to the DMF solution containing 120 mg of graphene oxide, and is then heated to 75° C. in a nitrogen atmosphere and then reacted for 15 h. The excess DMF is then steamed under reduced pressure and the resulting material is then vacuum dried at 60° C. to obtain acyl-chlorinated graphene oxide (ACGO). Then 8 mg of the acyl-chlorinated graphene oxide (ACGO) is dispersed in 50 mL of DMF, and is then uniformly stirred in the presence of nitrogen, and 8 mg of 3-thiophenecarboxylic acid is then added with stirring for 50 minutes. Then 1.5 mL of triethylamine is added and the resulting material is heated to 115° C. for 15 h. The excess 3-thiophenecarboxylic acid is then centrifugally removed to obtain an acetylated product. The acetylated product is then transferred to a three-necked flask, and 30 mL of anhydrous chloroform is added and the mixture is ultrasonically mixed for 50 minutes. Then 12 mL of a chloroform solution of 3-hexylthiophene (with a concentration of 15 mg/mL) is then added, then the resulting mixture is stirred for 15 h, then 0.6 g of anhydrous ferric chloride is added and material is reacted for 15 h at room temperature. Following the reaction, the solution is poured into methanol to precipitate a product and the precipitated product is purified by a Soxhlet extraction method. The purified product is the vacuum dried for 6 h to obtain graphene oxide that has been functionalized with poly (3-hexylthiophene);

Step 2: Preparation of Nitrogen-Doped Graphene Functionalized with Poly (3-hexylthiophene)

Sufficient amounts of urea and graphene oxide that has been functionalized with poly (3-hexylthiophene) are added into a beaker with 55 mL of distilled water and the resulting mixture is then mixed uniformly in an ultrasonic mixer, then dried at 35° C. The dried product is then transferred to a PTFE-lined hydrothermal reactor and is reacted for 2 h at 130° C., then cooled, and the solid product is then washed to obtain nitrogen-doped graphene that has been functionalized with poly (3-hexylthiophene).

Step 3: Deposition of Manganese Dioxide Nanoparticles on Graphene

The nitrogen-doped graphene that has been functionalized with poly (3-hexylthiophene) and sufficient amounts of $MnCl_2.4H_2O$ and isopropanol are mixed to form a solution, that is then heated to 65° C. under stirring, in order to obtain a mixed solution. Then a sufficient amount of $KMnO_4$ is added to the mixed solution, and the resulting mixture is reacted for 1.5 h. The resulting black precipitate obtained by this reaction is then centrifuged, washed, dried and ground to obtain nitrogen-doped graphene functionalized with poly (3-hexylthiophene).

Embodiment 3

The embodiment provides a hybrid supercapacitor electrical energy storage device, as described herein, comprising an electrode plate, an isolation film, a pole and a shell, wherein the electrode plate comprises a current collector and a coating disposed on the current collector, the coating comprises active material, conductive agent and adhesive in the mass ratio of 75:17:8.

The active material comprises carbon material, the conductive polymer is polypyrrole having a weight-average molecular weight of 5,000-100,000. The carbon material, conductive polymer and graphite-type carbon nitride are combined in the mass ratio of 65:27:8, where the carbon material is nitrogen-doped graphene that has been functionalized with poly (3-hexylthiophene), the graphene has a lamellar structure having 35 layers and a layer thickness of 1.0 nm to 1.6 nm, and the graphene has a porous structure having a pore diameter of 40 nm to 2 μm. The surface of the graphene is deposited with manganese dioxide nanoparticles as well. Further, the graphene has an atomic content of nitrogen dopant at the level of 4 at %, and the mass ratio of poly (3-hexylthiophene) to graphene is 1:15. The particle size of the manganese dioxide nanoparticles is 50n to 500 nm, and the mass ratio of the total mass of manganese dioxide nanoparticles to the graphene is 1:25.

The graphite type carbon nitride has a mesoporous structure having a pore diameter of 10 nm to 20 nm.

The conductive agent is acetylene black, and the binder is polytetrafluoroethylene.

The preparation method of the nitrogen-doped graphene that has been functionalized with poly (3-hexylthiophene) comprises the following steps:

Step 1: Preparation of the Graphene Oxide Functionalized with Poly (3-Hexylthiophene)

30 mL of $SOCl_2$ is added to a DMF solution containing 70 mg of graphene oxide. The mixture is then heated to 85° C. in a nitrogen atmosphere and is then reacted for 25 h. The excess DMF is then steamed under reduced pressure and the resulting material is then vacuum dried at 65° C. to obtain acyl-chlorinated graphene oxide (ACGO). Then 12 mg of the acyl-chlorinated graphene oxide (ACGO) is dispersed in 50 mL of DMF, and the resulting mixture is uniformly stirred in the presence of nitrogen, and 12 mg of 3-thiophenecarboxylic acid is subsequently added with stirring for 30 minutes. Then 2.5 mL of triethylamine is added, and the resulting material is heated to 125° C. for 25 h. The excess 3-thiophenecarboxylic acid is then centrifigally removed to obtain an acetylated product. The acetylated product is then transferred to a three-necked flask, and 55 mL of anhydrous chloroform is then added and the resulting mixture is ultrasonically mixed for 65 minutes. Then 14 mL of a chloroform solution having a concentration of 3-hexylthiophene of 26 mg/mL is added to the mixture and then stirred for 25 h. Then 0.75 g of anhydrous ferric chloride is added and the resulting mixture is reacted for 20 h at room temperature. Following the reaction, the resulting solution is poured into methanol in order to precipitate a product and the precipitate is then purified by a Soxhlet extraction method. After extraction, the product is then vacuum dried for 7 h to obtain graphene oxide that has been functionalized with poly (3-hexylthiophene);

Step 2: Preparation of Nitrogen-Doped Graphene Functionalized with Poly (3-Hexylthiophene)

Sufficient amounts of urea and graphene oxide that has been functionalized with poly (3-hexylthiophene) are then added to a beaker containing 65 mL of distilled water and the resulting mixture is mixed uniformly in an ultrasonic mixer and then dried at 45° C. The dried product is then transferred to a PTFE-lined hydrothermal reactor, and is then reacted for 4 h at 130° C., and is then cooled, and the solid resulting product is washed to obtain nitrogen-doped graphene that has been functionalized with poly (3-hexylthiophene).

Step 3: Deposition of Manganese Dioxide Nanoparticles on Graphene

The nitrogen-doped graphene that has been functionalized with poly (3-hexylthiophene) and a sufficient amounts of $MnCl_2 \cdot 4H_2O$ and isopropanol are mixed to form a solution that is then heated to 75° C. under stirring, in order to obtain a mixed solution. A sufficient amount of $KMnO_4$ is then added to the mixed solution, and the resulting mixture is then reacted for 2.5 h. The black precipitate obtained by the reaction is then centrifuged, washed, dried and ground to obtain nitrogen-doped graphene functionalized with poly (3-hexylthiophene).

Embodiments 1 to 3 exhibited cycle life exceeding 5,000 charge/discharge cycles, high capacitance density (C/V ca. 90,000 F/l to ca. 300,000 F/l), capacitance per mass (C/M ca. 40,000 F/Kg to ca. 150,000 F/Kg), high energy density (S/V ca. 70 Wh/l to 400 Wh/l), high energy per mass (S/M ca. 40 Wh/Kg to 150 Wh/Kg), high charge and energy retention ($R_C$ and $R_E \geq 70\%$ of initial charge voltage and stored energy respectively, as defined herein, at least 180 days after charging), high charge and discharge current capability ($I_C$ and $I_D \geq 1.2$ C, where C is equal to the amount of current required to discharge said apparatus to its termination voltage in a 1 hour period), high thermal stability ($T_{Upper}$ 70 C or higher, and $T_{Lower}$ −40 C), and high safety factor (i.e., fire resistance and explosion resistance "passes" as defined above). These apparatuses also exhibited rapid charge and discharge capability. As an example, due to the fire and explosion resistance of the devices of the present invention combined with other properties of said devices including at least consistency in capacitance value from device to device as well as consistency in equivalent series resistance (ESR) from device to device, a plurality of said devices may be used to form an apparatus of said devices wherein said apparatus may be configured with series or parallel electrical configuration or a mixture of both electrical configurations, and wherein no voltage management or voltage monitoring circuitry is necessary to enable charging or fast charging of said apparatus comprised of said devices. This further enables simplicity in design as well as reduced cost in these high performance assemblies.

Figure 2:
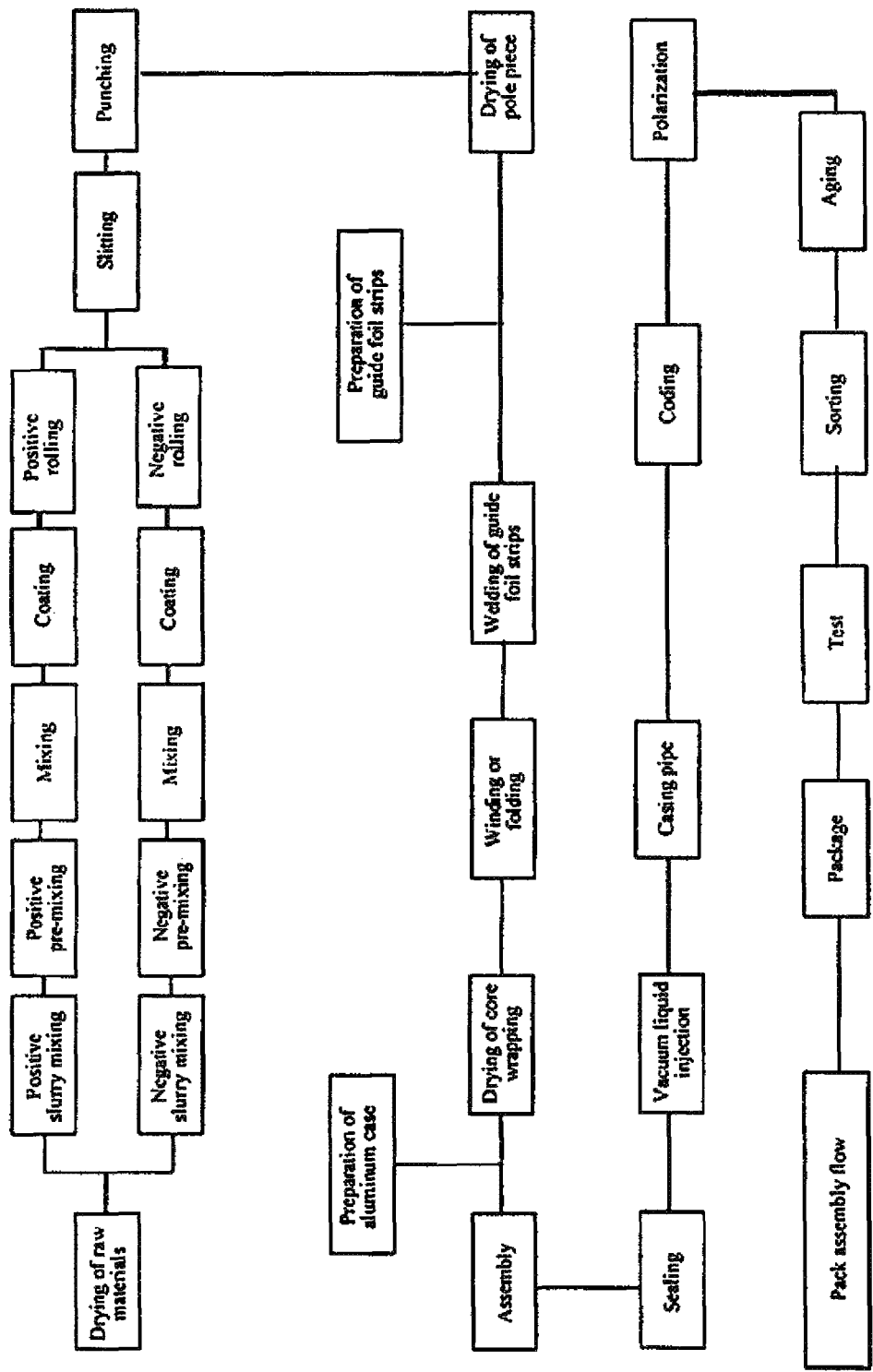
FIG. 2 is a schematic view of a process of forming components and assembly of a hybrid capacitor in accordance with the present invention.

As a non-limiting example, the apparatus is manufactured using the manufacturing process flow illustrated in FIG. 2. After the coating materials have been synthesized and dried, a slurry is produced for each of the anode (+) and the cathode (−). The slurry is then coated onto each associated current collector, each of which is rolled, then slit and then punched after the coating is dried. The pole pieces are then prepared and attached to the current collector, typically by welding, and the resulting films are interleaved with separator material and then are either wound into rolls or are folded into a prismatic structure or the like. A core wrapping is then applied and dried, and the assembly is inserted into a pre-prepared aluminum case, shell, bag or other suitable containment structure. The resulting assemblies are then placed under vacuum and are then impregnated with liquid electrolyte, and then sealed. A casing is then placed over the sealed assembly and the resulting apparatus is then coded, polarized, aged, sorted, tested and packaged for shipment to a customer.

The apparatus of the present invention can be made according to claim 1, wherein the preparation method of nitrogen-doped graphene that has been functionalized with poly (3-hexylthiophene) comprises the following steps:

Step 1, preparation of graphene oxide functionalized with poly (3-hexylthiophene): Thionyl Chloride ($SOCl_2$) is added to unsaturated dimethylfonnrmamide (DMF) solution wherein the mass ratio of ($SOCl_2$) to graphene oxide is between about 1000:1 and 300:1, and the $SOCl_2$, graphene oxide, DMF mixture is heated to 70° C.-90° C. in a nitrogen production atmosphere, and is reacted for 10 h to 30 h. The excess DMF is removed by steaming under reduced pressure, and the mixture is then vacuum dried at 40° C.-70° C. in order to obtain acyl-chlorinated graphene oxide. The acyl-chlorinated graphene oxide (ACGO) is then dispersed in DMF at the mass ratio of ACGO to DMF of about 1:3,000 to 1:10,000. The mixture is uniformly stirred under the protection of nitrogen gas, and then 0.01 w % to 0.03 w % of 3-thiophenecarboxylic acid is added. After stirring for 20 min to 1 hour, from 1 w % to 10 w %, and more preferably from 1.5 w % to 4.6 w % of triethylamine is added and the mixture is heated to between 110° C. and 130° C. and stirred for an additional 10 h to 30 h. The excess 3-thiophenecarboxylic acid is then centrifugally removed and the remaining supernatant acetylated product is then transferred to a reaction vessel. Next anhydrous chloroform is added at the level of 25V % to 60V % and the mixture is ultrasonically reacted for 40 minutes to 80 minutes, and a chloroform solution of 3-hexylthiophene, having a concentration of 15 mg/mL to 30 mg/mL is then added to the mixture at the level of 6.5V % to 17.5V %. The resulting mixture is then fully stirred for 10 h to 30 h, and then anhydrous ferric chloride is added at a level of 03 w % to 1.1 w %, and is then reacted for 10 h to 24 h at room temperature. After the reaction has completed, the solution is then poured into excess methanol to precipitate a product; and the resulting product is purified by the Soxhlet extraction method. The product is then vacuum dried for 3 h to 10 h in order to obtain graphene oxide that has been functionalized with poly (3-hexylthiophene);

Step 2, preparation of nitrogen-doped graphene functionalized with poly (3-hexylthiophene): Sufficient amounts of urea and graphene oxide functionalized with poly (3-hexylthiophene) are added into a beaker already containing an excess of distilled water. The resulting mixture is then added and stirred uniformly in an ultrasonic wave. The resulting mixture is then dried at 30° C.-50° C., then transferred to a PTFE-lined hydrothermal reactor, then naturally cooled after being reacted for 1 h to 5 h at 130° C. The resulting product is a solid that is then washed to obtain nitrogen-doped graphene that has been functionalized with poly (3-hexylthiophene);

Step 3, deposition of manganese dioxide nanoparticles on graphene: The nitrogen-doped graphene that has been functionalized with poly (3-hexylthiophene), is mixed with sufficient $MnCl_2.4H_2O$ and isopropanol in order to form a mixed solution, which is then heated to 60° C.-85° C. under stirring, in order to obtain a mixed solution. A sufficient amount of $KMnO_4$ is then added to the mixed solution, and the resulting mixture is then reacted for 1 h to 3 h. The obtained black precipitate is then centrifuged, washed, dried and ground to obtain nitrogen-doped graphene functionalized with poly (3-hexylthiophene).

The present invention lends itself to numerous embodiments for a variety of different type of energy storage devices. The devices include, but are not limited to, embodiments which consist of or comprise the following:

An electrical energy storage apparatus comprising: an electrode plate; an isolation film; a pole; and, a shell;

wherein the electrode plate comprises a current collector and a coating is disposed on the current collector, the coating comprises active material, conductive agent and a binder in the mass ratio of (70-95):(2-20):(3-10) and where the active material comprises carbon material, conductive polymer and graphite type carbon nitride in the mass ratio of (60-90):(5-30):(5-10), and the carbon material is nitrogen-doped graphene functionalized with poly (3-hexylthiophene), in which the surface of the graphene is deposited with nanoparticles of an oxide of manganese dioxide or the like and the conductive polymer is at least one of polyaniline, polythiophene or polypyrrole.

An electrical energy storage apparatus, wherein when at an operating temperature of −10 C, the apparatus exhibits at least one of a performance value selected from the group consisting of a capacitance density that exceeds about 10,000 F/l, a capacitance per mass that exceeds about 7,000 F/Kg, a useful energy density that exceeds about 550 Wh/l, and a useful energy per mass exceeds about 250 Wh/Kg.

An electrical energy storage apparatus, wherein at an operating temperature of −20 C the apparatus, exhibits at least one of a performance value selected from the group consisting of a capacitance density that exceeds about 10,000 F/l, a capacitance per mass that exceeds about 7,000 F/Kg, a useful energy density that exceeds about 35 Wh/l, and a useful energy per mass exceeds about 15 Wh/Kg.

An electrical energy storage apparatus, wherein at an operating temperature of 60 C, the apparatus has at least one of a performance value selected from the group consisting of a capacitance density that exceeds about 10,000 F/l, a capacitance per mass that exceeds about 7,000 F/Kg, a useful energy density that exceeds about 35 Wh/i, and a useful energy per mass exceeds about 15 Wh/Kg.

An electrical energy storage apparatus, wherein following 40,000 charge/discharge cycles, exhibits at least one of a performance value selected from the group consisting of a capacitance density exceeds about 10,000 F/l a capacitance per mass exceeds about 7,000 F/Kg, a useful energy density exceeds about 35 Wh/l, and a useful energy per mass exceeds about 15 Wh/Kg.

An electrical energy storage apparatus, wherein the apparatus, 180 days following a full charge, exhibits at least one of a performance value selected from the group consisting of a capacitance density that exceeds about 10,000 F/l a capacitance per mass that exceeds about 7,000 F/Kg, a useful energy density that exceeds about 150 Wh/l, and a useful energy per mass that exceeds about 70 Wh/Kg.

An electrical energy storage apparatus, wherein after 40,000 charge/discharge cycles, and wherein the charging current and/or the discharging current exceeds 1.2 C, where C is the current required to discharge said apparatus to its terminal voltage within a period of 1 hours, the apparatus exhibits at least one of a performance value selected from the group consisting of a capacitance density that exceeds about 10,000 F/l, a capacitance per mass that exceeds about 7,000 F/Kg, a useful energy density that exceeds about 35 Wh/l, and a useful energy per mass that exceeds about 15 Wh/Kg.

An electrical energy storage apparatus, wherein said apparatus is fire resistant per at least section 4.5 of specification GB/T 18287, and exhibits at least one of a performance value selected from the group consisting of a capacitance density that exceeds about 10,000 F/l, a capacitance per mass that exceeds about 7,000 F/Kg, a useful energy density that exceeds about 35 Wh/l, and a useful energy per mass that exceeds about 15 Wh/Kg.

An electrical energy storage apparatus, wherein said apparatus is explosion resistant per at least section 4.5 of specification GB/T 18287, and exhibits at least one of a performance value selected from the group consisting of a capacitance density that exceeds about 10,000 F/l, a capacitance per mass that exceeds about 7,000 F/Kg, a useful energy density that exceeds about 35 Wh/l, and a useful energy per mass that exceeds about 15 Wh/Kg.

An electrical energy storage apparatus selected from the group consisting of a capacitor, a supercapacitor, an electric double layer capacitor, a hybrid capacitor, and a hybrid supercapacitor having at least one of a performance value selected from the group consisting of a capacitance density that exceeds about 10,000 F/l, a capacitance per mass that exceeds about 7,000 F/Kg, an energy density that exceeds about 35 Wh/l, and an energy per mass that exceeds about 15 Wh/Kg is exhibited.

An electrical energy storage apparatus, wherein at an operating temperature of −20 C the apparatus, exhibits at least one of a performance value selected from the group consisting of a capacitance density that exceeds about 10,000 F/l, a capacitance per mass that exceeds about 7,000 F/Kg, a useful energy density that exceeds about 130 Wh/l, and a useful energy per mass exceeds about 56 Wh/Kg.

An electrical energy storage apparatus, wherein at an operating temperature of 60 C, the apparatus has at least one of a performance value selected from the group consisting of a capacitance density that exceeds about 10,000 F/l, a capacitance per mass that exceeds about 7,000 F/Kg, a useful energy density that exceeds about 130 Wh/l, and a useful energy per mass exceeds about 56 Wh/Kg.

An electrical energy storage apparatus, wherein following 40,000 charge/discharge cycles, exhibits at least one of a performance value selected from the group consisting of a capacitance density exceeds about 10,000 F/l a capacitance per mass exceeds about 7,000 F/Kg, a useful energy density exceeds about 130 Wh/l, and a useful energy per mass exceeds about 56 Wh/Kg.

An electrical energy storage apparatus, wherein the apparatus, 180 days following a full charge, exhibits at least one of a performance value selected from the group consisting of a capacitance density that exceeds about 10,000 F/l a capacitance per mass that exceeds about 7,000 F/Kg, a useful energy density that exceeds about 150 Wh/l, and a useful energy per mass that exceeds about 70 Wh/Kg.

An electrical energy storage apparatus, wherein after 40,000 charge/discharge cycles, and wherein the charging current and/or the discharging current exceeds 1.2 C, where C is the current required to discharge said apparatus to its terminal voltage within a period of 1 hours, the apparatus exhibits at least one of a performance value selected from the group consisting of a capacitance density that exceeds about 10,000 F/l, a capacitance per mass that exceeds about 7,000 F/Kg, a useful energy density that exceeds about 130 Wh/l, and a useful energy per mass that exceeds about 56 Wh/Kg.

An electrical energy storage apparatus, wherein said apparatus is fire resistant per at least section 4.5 of specification GB/T 18287, and exhibits at least one of a performance value selected from the group consisting of a capacitance density that exceeds about 10,000 F/l, a capacitance per mass that exceeds about 7,000 F/Kg, a useful energy density that exceeds about 130 Wh/l, and a useful energy per mass that exceeds about 56 Wh/Kg.

An electrical energy storage apparatus, wherein said apparatus is explosion resistant per at least section 4.5 of specification GB/T 18287, and exhibits at least one of a performance value selected from the group consisting of a capacitance density that exceeds about 10,000 F/l, a capacitance per mass that exceeds about 7,000 F/Kg, a useful energy density that exceeds about 130 Wh/l, and a useful energy per mass that exceeds about 56 Wh/Kg.

An electrical energy storage apparatus selected from the group consisting of a capacitor, a supercapacitor, an electric double layer capacitor, a hybrid capacitor, and a hybrid supercapacitor having at least one of a performance value selected from the group consisting of a capacitance density that exceeds about 10,000 F/l, a capacitance per mass that exceeds about 7,000 F/Kg, an energy density that exceeds about 130 Wh/l, and an energy per mass that exceeds about 56 Wh/Kg is exhibited.

The apparatus according to any of the prior embodiments wherein the atomic content of the doped nitrogen is between above 0.1 at % to about 10 at %

The apparatus according to any of the prior embodiments wherein the atomic content of the doped nitrogen is between about 1 at % to about 5 at %.

The apparatus according to any of the prior embodiments wherein the mass ratio of poly (3-hexylthiophene) to graphene is between about 1 to about 10-40.

The apparatus according to any of the prior embodiments wherein the particle size of the oxides of manganese nanoparticles is between about 10 nm to about 1 μm. The apparatus according to any of the prior embodiments wherein the particle size of the oxides of manganese nanoparticles is between about 50 nm to about 500 nm.

The apparatus according to any of the prior embodiments wherein the mass ratio of the total mass of the oxides of manganese nanoparticles to graphene is from about 1:10 to about 1:30.

The apparatus according to any of the prior embodiments wherein the conductive polymer has a weight-average molecular weight of between about 1,000 to about 1,000,000.

The apparatus according to any of the prior embodiments wherein the conductive polymer has a weight-average molecular weight of from between about 5,000 to about 100,000.

The apparatus according to any of the prior embodiments wherein the graphite-type carbon nitride has a porous structure having a pore diameter of between about 2 nm to about 200 nm.

The apparatus according to any of the prior embodiments herein the graphite-type carbon nitride has a mesoporous structure having a pore diameter of between about 10 μm to about 20 nm.

The apparatus according to any of the prior embodiments herein the graphene has a lamellar structure having 1-1,000 layers and each layer thickness is from between about 0.4 nm to about 5 nm.

The apparatus according to any of the prior embodiments wherein the graphene has a lamellar structure having from between about 20 to about 100 layers with each layer thickness having a thickness from about 1.0 to about 1.6 nm.

The apparatus according to any of the prior embodiments herein the graphene has a porous structure having a pore diameter of about 2 nm to about 10 μm.

The apparatus according to any of the prior embodiments wherein the graphenc has a porous structure having a pore diameter of about 40 nm to about 2 μm.

The apparatus according to any of the prior embodiments herein the conductive agent is acetylene black, carbon black or combination thereof.

The apparatus according to any of the prior embodiments wherein the binder is polyvinylidene fluoride, polytetrafluoroethylene, or a combination thereof.

The apparatus according to any of the prior embodiments wherein the nitrogen-doped graphene that has been functionalized with poly (3-hexylthiophene) that has been produced using a three step process comprising first the step of preparation of graphene oxide functionalized with poly (3-hexylthiophene), and second the step of preparation of nitrogen-doped graphene functionalized with poly (3-hexylthiophene), and third the step of the deposition of oxides of manganese nanoparticles, such as manganese dioxide nanoparticles or the like, on graphene.

The apparatus according to any of the prior embodiments wherein when an operating temperature of about −10 C is used the apparatus exhibits at least one of a performance value selected from the group consisting of a capacitance density that exceeds about 10,000 F/l, a capacitance per mass that exceeds about 7,000 F/Kg, a useful energy density that exceeds about 550 Wh/l, and a useful energy per mass that exceeds about 250 Wh/Kg.

The apparatus according to any of the prior embodiments wherein when an operating temperature of about −20 C is used, the apparatus has at least one of a performance value selected from the group consisting of a capacitance density that exceeds about 10,000 F/l, a capacitance per mass that exceeds about 7,000 F/Kg, a useful energy density that exceeds about 35 Wh/l, and a useful energy per mass that exceeds about 15 Wh/Kg.

The apparatus according to any of the prior embodiments wherein when an operating temperature of 60 C is used, at least one of a performance value is achieved selected from the group consisting of a capacitance density that exceeds about 10,000 F/l, a capacitance per mass that exceeds about 7,000 F/Kg, a useful energy density that exceeds about 35 Wh/l and a useful energy per mass that exceeds about 15 Wh/Kg.

The apparatus according to any of the prior embodiments wherein following 40,000 charge/discharge cycles, at least one of a performance value is achieved selected from the group consisting of a capacitance density that exceeds about 10,000 F/l, a capacitance per mass that exceeds about 7,000 F/Kg, a useful energy density that exceeds about 35 Wh/l, and a useful energy per mass exceeds about 15 Wh/Kg is exhibited.

The apparatus according to any of the prior embodiments wherein the apparatus, following 180 days subsequent to fully charging, exhibits at least one of a performance value selected from the group consisting of a capacitance density that exceeds about 10,000 F/l, a capacitance per mass that exceeds about 7,000 F/Kg, a useful energy density that exceeds about 150 Wh/l, and a useful energy per mass that exceeds about 70 Wh/Kg.

The apparatus according to any of the prior embodiments wherein subsequent to at least about 40,000 charge/discharge cycles, and wherein the charging current and/or the discharging current exceeds 1.2 C, where C is the current required to discharge said apparatus to its terminal voltage within a period of 1 hours, and said apparatus exhibits at least one of a performance value selected from the group consisting of a capacitance density that exceeds about 10,000 F/l, a capacitance per mass that exceeds about 7,000 F/Kg, a useful energy density that exceeds about 35 Wh/l, and a useful energy per mass that exceeds about 15 Wh/Kg.

The apparatus according to any of the prior embodiments wherein said apparatus is fire resistant per at least section 4.5 of specification GB/T 18287, and exhibits at least one of a performance value selected from the group consisting of a capacitance density that exceeds about 10,000 F/l, a capacitance per mass that exceeds about 7,000 F/Kg, a useful energy density that exceeds about 35 Wh/l, and a useful energy per mass that exceeds about 15 Wh/Kg.

The apparatus according to any of the prior embodiments wherein said apparatus is explosion resistant per at least section 4.5 of specification GB/T 18287, and exhibits at least one of a performance value selected from the group consisting of a capacitance density that exceeds about 10,000 F/l, a capacitance per mass that exceeds about 7,000 F/Kg, a useful energy density that exceeds about 35 Wh/l, and a useful energy per mass that exceeds about 15 Wh/Kg.

The apparatus according to any of the prior embodiments wherein at least one of a performance value selected from the group consisting of a capacitance density exceeds about 10,000 F/l, or a capacitance per mass exceeds about 7,000 F/Kg, an energy density exceeds about 35 Wh/i, or an energy per mass exceeds about 15 Wh/Kg is exhibited, and the apparatus is a capacitor, a supercapacitor, an electric double layer capacitor, a hybrid capacitor, or a hybrid supercapacitor.

The apparatus according to any of the prior embodiments wherein is operatively engaged in an electronic apparatus.

The apparatus according to any of the prior embodiments wherein is operable in an electrical or electronic device, apparatus or appliance.

The apparatus according to any of the prior embodiments wherein used in a portable electronic appliance.

The apparatus according to any of the prior embodiments wherein used in a portable electrical appliance.

The apparatus according to any of the prior embodiments wherein used in transportation apparatus.

The apparatus according to any of the prior embodiments wherein used as an energy or power source in transportation apparatus.

The apparatus according to any of the prior embodiments wherein a plurality of said apparatus are used to provide the energy source.

The apparatus according to any of the prior embodiments wherein at least two of the plurality of apparatus are connected in series.

The apparatus according to any of the prior embodiments wherein at least two of the plurality of apparatus are connected in parallel.

The apparatus according to any of the prior embodiments wherein said apparatus has no charging voltage management circuitry nor any charging voltage management circuitry.

The apparatus according to any of the prior embodiments wherein said apparatus has no charging voltage monitoring circuitry nor connects to any charging voltage monitoring circuitry.

The apparatus according to any of the prior embodiments wherein said apparatus is charged using voltage pulses.

The apparatus according to any of the prior embodiments wherein said apparatus is charged using current pulses.

The apparatus according to any of the prior embodiments wherein used as a power or energy source in a radio controlled device.

The apparatus according to any of the prior embodiments wherein used as a power or energy source for a sessile apparatus.

The apparatus according to any of the prior embodiments wherein used as a power or energy source for a backup power supply.

The apparatus according to any of the prior embodiments a plurality of the apparatus are used to provide said energy source.

The apparatus according to any of the prior embodiments wherein at least two of the plurality of the apparatus are connected in series.

The apparatus according to any of the prior embodiments wherein at least two of the plurality of the apparatus are connected in parallel.

The apparatus according to any of the prior embodiments wherein the apparatus has no charging voltage management circuitry nor requires charging voltage management circuitry for recharging the apparatus.

The apparatus according to any of the prior embodiments wherein the apparatus has no charging voltage management circuitry nor requires charging voltage management circuitry for recharging the apparatus.

The apparatus according to any of the prior embodiments wherein the apparatus is charged using voltage pulses.

The apparatus according to any of the prior embodiments wherein the apparatus is charged using current pulses.

The apparatus according to any of the prior embodiments wherein the apparatus is used as a power or energy source in a radio controlled device.

The apparatus according to any of the prior embodiments wherein the apparatus is used as a power or energy source for a sessile apparatus.

The apparatus according to any of the prior embodiments wherein the apparatus is used as a power or energy source for a backup power supply.

The apparatus according to any of the prior embodiments wherein a plurality of the apparatus are used to provide said energy source.

The apparatus according to any of the prior embodiments wherein at least two of the plurality of the apparatus are connected in series.

The apparatus according to any of the prior embodiments wherein at least two of the plurality of the apparatus are connected in parallel.

The apparatus according to any of the prior embodiments wherein the apparatus has no charging voltage management circuitry nor requires charging voltage management circuitry for recharging the apparatus.

The apparatus according to any of the prior embodiments wherein the apparatus has no charging voltage management circuitry nor requires charging voltage management circuitry for recharging the apparatus.

The apparatus according to any of the prior embodiments wherein the apparatus is charged using voltage pulses.

The apparatus according to any of the prior embodiments wherein the apparatus is charged using current pulses.

The apparatus according to any of the prior embodiments wherein the apparatus is used as a power or energy source in a radio controlled device.

The apparatus according to any of the prior embodiments wherein the apparatus is used as a power or energy source for a sessile apparatus.

The apparatus according to any of the prior embodiments wherein the apparatus is used as a power or energy source for a backup power supply.

Although the preferred embodiments of the invention have been described using specific terms, apparatuses, and methods, such description is for illustrative purposes only. The words used are words of description rather than of limitation. It is to be understood that changes and variations may be made by those of ordinary skill in the art without departing from the spirit or the scope of the present invention which is set forth in the following claims. For example, the device is an electrical energy storage device which includes, but is not limited to the categories of: capacitors, supercapacitors, electrical double layer capacitors, pseudo-capacitors, hybrid capacitors, hybrid supercapacitors, primary batteries, and secondary or rechargeable batteries and the like. In addition, it should be understood that aspects of the various embodiments may be interchanged, either in whole or in part. Therefore, the spirit and scope of the appended claims should not be limited to the description of the preferred versions contained therein.

The invention claimed is:

1. An electrical energy storage apparatus comprising:
an electrode plate;
an isolation film;
a pole; and,
a shell;
wherein the electrode plate comprises a current collector and a coating is disposed on the current collector; the coating comprises active material, conductive agent and a binder in the mass ratio of (70-95):(2-20):(3-10) and where the active material comprises carbon material, conductive polymer and graphite type carbon nitride in the mass ratio of (60-90):(5-30):(5-10), and the carbon material is nitrogen-doped graphene functionalized with poly (3-hexylthiophene), in which the surface of the graphene is deposited with nanoparticles of an oxide of manganese dioxide and the conductive polymer is at least one of is polyaniline, polythiophene or polypyrrole.

2. The apparatus according, to claim 1, wherein the atomic content of the doped nitrogen is between above 0.1 at % to about 10 at %.

3. The apparatus according to claim 1, wherein the atomic content of the doped
nitrogen is between about 1 at % to about 5 at %.

4. The apparatus according to claim 1 wherein the mass ratio of poly (3-hexylthiophene) to graphene is between about 1 to about 10-40.

5. The apparatus according to claim 1, wherein the particle size of the oxides of manganese nanoparticles is between about 10 nm to about 1 μm.

6. The apparatus according to claim 1, wherein the particle size of the oxides of manganese nanoparticles is between about 50 nm to about 500 nm.

7. The apparatus of claim 1, wherein the mass ratio of the total mass of the oxides of manganese nanoparticles to graphene is from about 1:10 to about 1:30.

8. The apparatus according to claim 1, wherein the conductive polymer has a weight-average molecular weight of between about 1,000 to about 1,000,000.

9. The apparatus according to claim 1, wherein the conductive polymer has a weight-average molecular weight of from between about 5,000 to about 100,000.

10. The apparatus according to claim 1, wherein the graphite-type carbon nitride has a porous structure having a pore diameter of between about 2 nm to about 200 nm.

11. The apparatus of claim 1, wherein when an operating temperature of about −10 C is used the apparatus exhibits at least one of a performance value selected from the group consisting of a capacitance density that exceeds about 10,000 F/l, a capacitance per mass that exceeds about 7,000 F/Kg, a useful energy density that exceeds about 550 Wh/l and a useful energy per mass that exceeds about 250 Wh/Kg.

12. The apparatus of claim 1, wherein when an operating temperature of about −20 C is used, the apparatus has at least one of a performance value selected from the group consisting of a capacitance density that exceeds about 10,000 F/l, a capacitance per mass that exceeds about 7,000 F/Kg, a useful energy density that exceeds about 35 Wh/l and a useful energy per mass that exceeds about 15 Wh/Kg.

13. The apparatus of claim 1, wherein when an operating temperature of 60 C is used, at least one of a performance value is achieved selected from the group consisting of a capacitance density that exceeds about 10,000 F/l, a capacitance per mass that exceeds about 7,000 F/Kg, a useful energy density that exceeds about 35 Wh/l and a useful energy per mass that exceeds about 15 Wh/Kg.

14. The apparatus of claim 1, wherein the apparatus, following 180 days subsequent to fully charging, exhibits at least one of a performance value selected from the group consisting of a capacitance density that exceeds about 10,000 F/l, a capacitance per mass that exceeds about 7,000 F/Kg, a useful energy density that exceeds about 150 Wh/l, and a useful energy per mass that exceeds about 70 Wh/Kg.

15. The apparatus of claim 1, wherein at least one of a performance value selected from the group consisting of a capacitance density exceeds about 10,000 F/l, or a capacitance per mass exceeds about 7,000 F/Kg, an energy density exceeds about 35 Wh/l, or an energy per mass exceeds about 15 Wh/Kg is exhibited, and the apparatus is a capacitor, a supercapacitor, an electric double layer capacitor, a hybrid capacitor, or a hybrid supercapacitor.

* * * * *